United States Patent [19]

Imamura et al.

[11] 4,255,051
[45] Mar. 10, 1981

[54] APPARATUS FOR EMISSION SPECTROCHEMICAL ANALYSIS

[75] Inventors: Naoki Imamura; Isao Fukui; Junichi Ono, all of Kyoto, Japan

[73] Assignee: Shimadzu Corporation, Kyoto, Japan

[21] Appl. No.: 76,751

[22] Filed: Sep. 18, 1979

[30] Foreign Application Priority Data

Sep. 29, 1978 [JP] Japan ............................... 53-120679

[51] Int. Cl.³ .......................... G01J 3/30; G01N 21/67
[52] U.S. Cl. ...................................... 356/306; 356/313
[58] Field of Search ........................ 356/306, 313, 328

[56] References Cited

U.S. PATENT DOCUMENTS 2,675,734  4/1954  Hasler et al. ........................... 356/306
3,547,541  12/1970  Varnela ................................... 356/306

Primary Examiner—F. L. Evans

Attorney, Agent, or Firm—Fidelman, Wolffe & Waldron

[57] ABSTRACT

Apparatus for emission spectrochemical analysis wherein the sample to be analyzed is excited by repeated spark discharge to emit light, which is dispersed to produce a spectrum containing emission lines characteristic of the elements in the sample. The intensity or quantity of light of each of the emission lines of the elements to be determined and that of the corresponding one of the emission lines selected as the internal standards for the elements to be determined are measured each time a spark discharge is produced to obtain the ratio of the former intensity or quantity to the latter at each spark discharge, and the ratios resulting from a predetermined number of spark discharges are averaged for each of the elements to be determined. From the average the content of each of the elements is read on a calibration curve.

9 Claims, 7 Drawing Figures

APPARATUS FOR EMISSION SPECTROCHEMICAL ANALYSIS

BACKGROUND OF THE INVENTION

This invention relates to emission spectroscopy and more particularly to an apparatus for emission spectrochemical analysis which utilizes spark discharge as the light source and is suitable for quantitative analysis.

Emission spectrochemical analysis is a method by which the elements contained in a sample are determined by exciting the sample to produce light, dispersing the light to produce a spectrum and identifying the element causing each of the emission lines in the spectrum.

To conduct a quantitative analysis by this method, both a sample to be analyzed and a reference which is of the same kind as the sample to be analyzed and which contains the elements to be quantitatively determined in known percentage are provided so that the sample and the reference are separately excited to obtain the spectral lines of the elements being determined, and the amount of each of the elements in the sample is determined by the ratio of the intensity of the spectral line of each of the elements in the sample being analyzed to the intensity of the corresponding spectral line of the same element in the reference.

The above method, however, has the disadvantage that it is time-consuming since a separate analytical operation is performed on the sample and the reference, and that since the two operations are conducted separately, strictly the analytical conditions are different with resulting poor reproducibility of the results of analysis.

To overcome the disadvantage, a method called the internal standard method has been proposed for quantitative determination by emission spectrochemical analysis. This method depends on a particular element always present in the sample in known amount and referred to as the internal standard element. When the sample is excited, the intensity of the spectral emission line produced by the particular element (to be referred to as the internal standard line) and that of the emission line produced by the element to be quantitatively determined are measured so as to obtain the intensity ratio therebetween. Separately, several references of the same kind as the sample to be analyzed are prepared which contain the element to be determined in different known amounts, and the intensity ratio of the emission line of the element to be determined to the internal standard line is measured for each of the references so as to plot the intensity ratio against the content of the element to be determined to obtain a calibration curve. Then by locating the intensity ratio of the spectral emission line obtained from the sample being measured to the internal standard line on the calibration curve to see what amount of the element the location of the ratio on the curve corresponds to, it is possible to determine the element quantitatively.

According to this method, quantitative comparison of the element to be determined and the internal standard element is made in the same sample and by the same procedure with resulting improvement in the reproducibility of measurement over the previously mentioned method. Moreover, a single operation suffices for analysis. With a calibration curve once plotted, it is not necessary to prepare a new curve for each operation of analysis.

When emission spectrochemical analysis is conducted on a test piece cut from a solid sample such as metal, spark discharge is suitably employed as the light source, and in this case the internal standard method is also employed for quantitative analysis. If carbon, silicon, manganese, sulfur, etc. in, for example, steel are to be quantitatively determined, the base metal, that is, iron itself is used as the internal standard element, and a suitable one of the emission lines of the spectrum produced by iron is used as the internal standard line.

The invention provides an apparatus for emission spectrochemical analysis which employs spark discharge as the light source and which is suitable for quantitative determination by the internal standard method.

Spark discharge comprises repeated pulse-like discharges, and in order to improve the precision of measurement it is customary to continue the discharge for a period of time, so that the light emitted during the period is converted to corresponding electric current for integration thereof. In practice, discharge is repeated at the rate of about 400 times per second and the values measured at individual discharges are integrated for a period of several to several tens seconds to obtain the average of the measured values. In quantitative analysis by the internal standard method spark discharge is caused to occur several thousands of times, at each of which the intensity of the internal standard line and that of the emission line of the element to be quantitatively determined are measured, and the measured values are averaged for the internal standard as well as for the element to be determined to calculate the ratio between the two averages, from which the content of the element to be determined is obtained with reference to a calibration curve.

Spark discharge, however, is a phenomenon so unstable that the state of light emission varies greatly each time discharge occurs. As a result, even with the above-mentioned averaging operation and despite the good reproducibility that the internal standard method inherently has, the conventional method of emission spectrochemical analysis utilizing spark discharge has been found unsatisfactory with respect to reproducibility.

Accordingly, the object of the invention is to provide an apparatus for emission spectrochemical analysis which utilizes spark discharge as the light source and which has a good reproducibility of the results of quantitative analysis.

The invention will be explained in detail with reference to the accompanying drawing.

SUMMARY OF THE INVENTION

Figure 1:
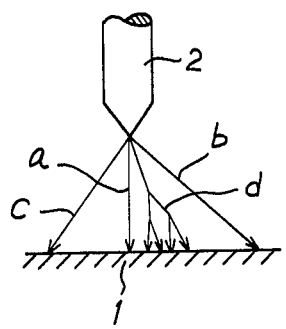
FIG. 1 is a schematic side view of a spark gap with different states of sparks.

The principle of the invention will first be explained with reference to FIG. 1, which schematically shows a spark gap to be used as a light source for emission spectrochemical analysis. There is shown a sample 1 to be analyzed which can be a test piece cut from a metallic object. An electrode 2 in the form of a rod having a pointed end is disposed opposite the sample with a suitable gap therebetween.

Spark discharge is passed between the sample 1 as the negative electrode and the rod 2 as the positive electrode. Spark discharge, however, does not always occur in the same position but follows different paths as shown at a, b, c each time it occurs, and sometimes the shape of the surface of the sample causes the spark to move as shown at d. As the spark varies in position and/or shape, the efficiency of incidence of the light from the spark into the spectrometer varies as well as the amount of light thereof, so that the apparent intensity of the emitted light varies each time discharge occurs.

On the other hand, the different elements contained in the sample are not uniformly dispersed therein but rather unevenly distributed to form a structure, so that the composition of the sample varies in different parts thereof where discharge occurs.

This is believed to be responsible for the poor reproducibility of the result of measurement in the conventional method despite that the internal standard method is employed and the results of measurement in many spark discharges are averaged.

In accordance with the invention, therefore, the ratio of the intensity or quantity of light of the emission line of the element to be determined to that of the internal standard line is obtained at each spark discharge so that the intensity or quantity ratios obtained from many spark discharges are averaged.

Another cause for the poor reproducibility in quantitative analysis by emission spectroscopy using spark discharge is believed to be as follows: The various elements responsible for the emission lines of a spectrum are excited by energy of particular levels of their own, so that the light which causes a particular emission line of the spectrum is emitted from a point at a particular height in the spark gap. In FIG. 1 the point of emission of light varies in height with different emission lines of the spectrum.

In accordance with the invention, therefore, the internal standard is not restricted to a single particular line or element, but such an internal standard line that can experimentally give the most stable result of analysis for each of the elements to be determined is selected. The arrangement has been found to achieve the expected good results.

DESCRIPTION OF PREFERRED EMBODIMENTS

Figure 2:
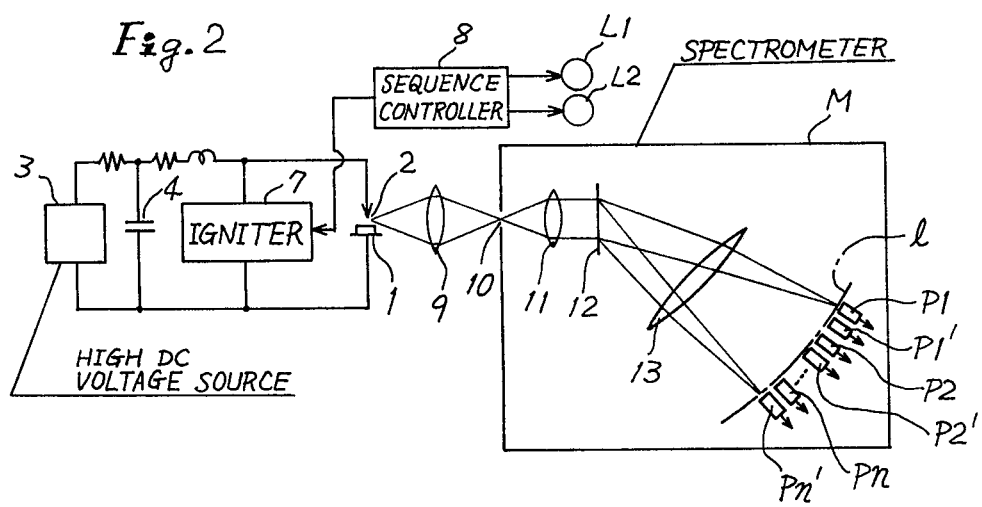
FIG. 2 is a block diagram schematically showing the discharge circuit and the structure of the spectrometer in one embodiment of the invention.

Some preferred embodiments of the invention will now be described with reference to FIG. 2 to FIG. 7. Referring first to FIG. 2, a sample 1 to be analyzed and an electrode 2 are opposed across a spark gap as shown in FIG. 1. A high DC voltage source 3 charges a capacitor 4, and an igniter 7 receives a command signal from a sequence controller 8 to produce an ignition pulse to be applied across the gap between the sample 1 and the electrode 2. The command signal from the controller 8 has a waveform as shown at a in FIG. 3, and triggers a discharge to be passed between the electrode 2 and the sample 1, with the discharge current being provided by the capacitor 4 as it discharges. The voltage across the capacitor 4 changes as shown at b in FIG. 3. As the spark discharge takes place, light is emitted as shown at c in FIG. 3.

The arrangement of the discharging circuit per se does not constitute the invention, so that only a brief explanation of the general structure of the circuit has been given above, and many other arrangements may be used for the purpose.

The light caused to emit by the spark discharge between the electrode 2 and the sample 1 is collected by a condensing lens 9 onto the entrance slit 10 a spectrometer M, through which the light enters the spectrometer.

Inside the spectrometer M the light passes through a collimating lens 11, which renders the light parallel. The light is then dispersed by a dispersing element 12 such as a grating into different wavelengths. A focusing lens 13 forms an image of the entrance slit 10 at those different positions along an image plane l which correspond to the different wavelengths.

A set of photoelectric transducers $P1, P2, \ldots Pn$ are arranged one at each of the positions on the image plane which correspond to the wavelengths of the spectral emission lines of the elements to be determined present in the sample. Another set of photoelectric transducers $P1', P2', \ldots Pn'$ are also arranged at those positions on the image plane which correspond to the wavelengths of several internal standard lines.

The transducers can be photomultiplier tubes, and the spectrometer M shown schematically in the drawing can be of any suitable type.

Figure 4:
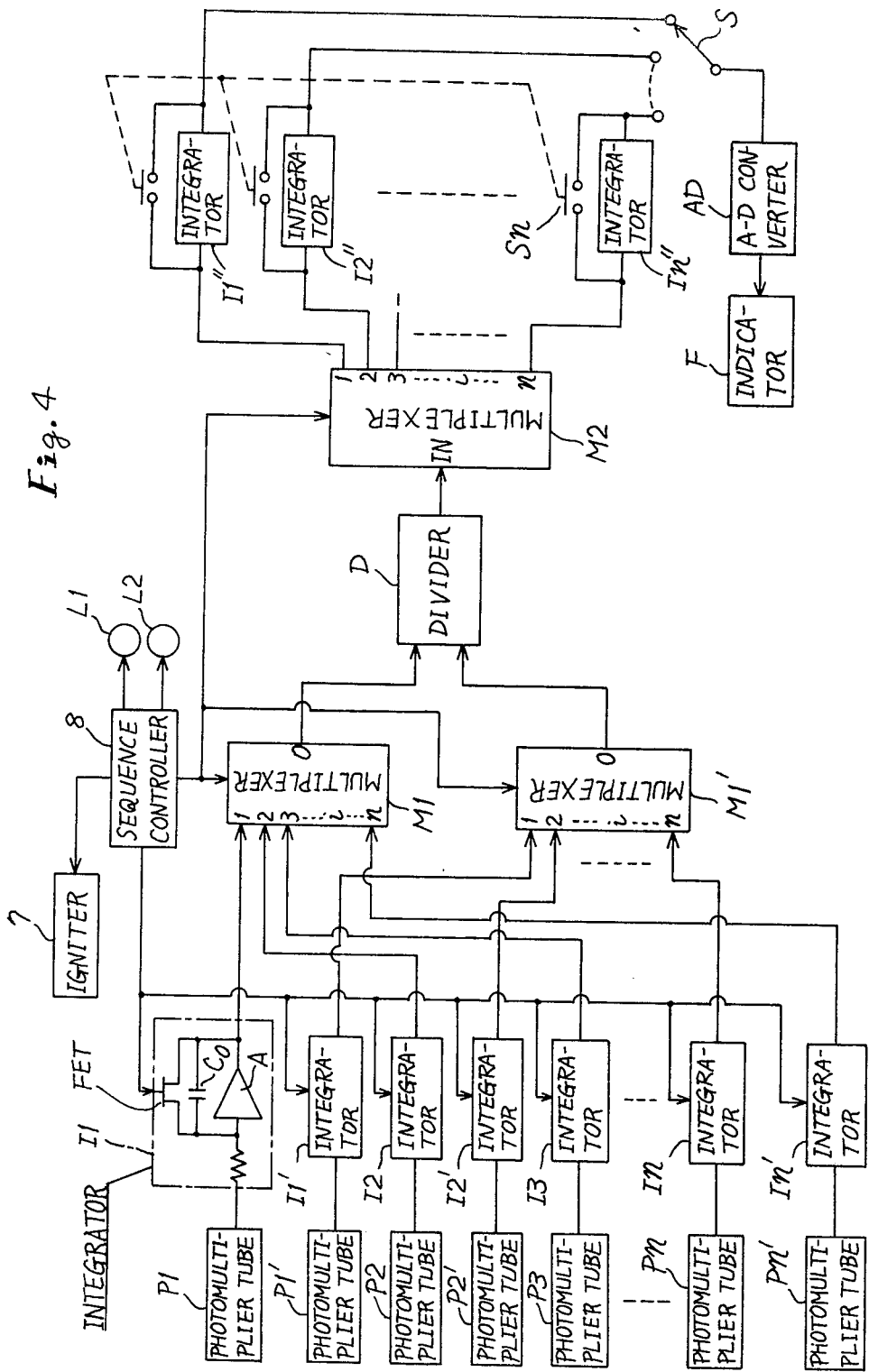
FIG. 4 is a block diagram of the circuit for dealing with signals in the apparatus of the invention.
Figure 5:
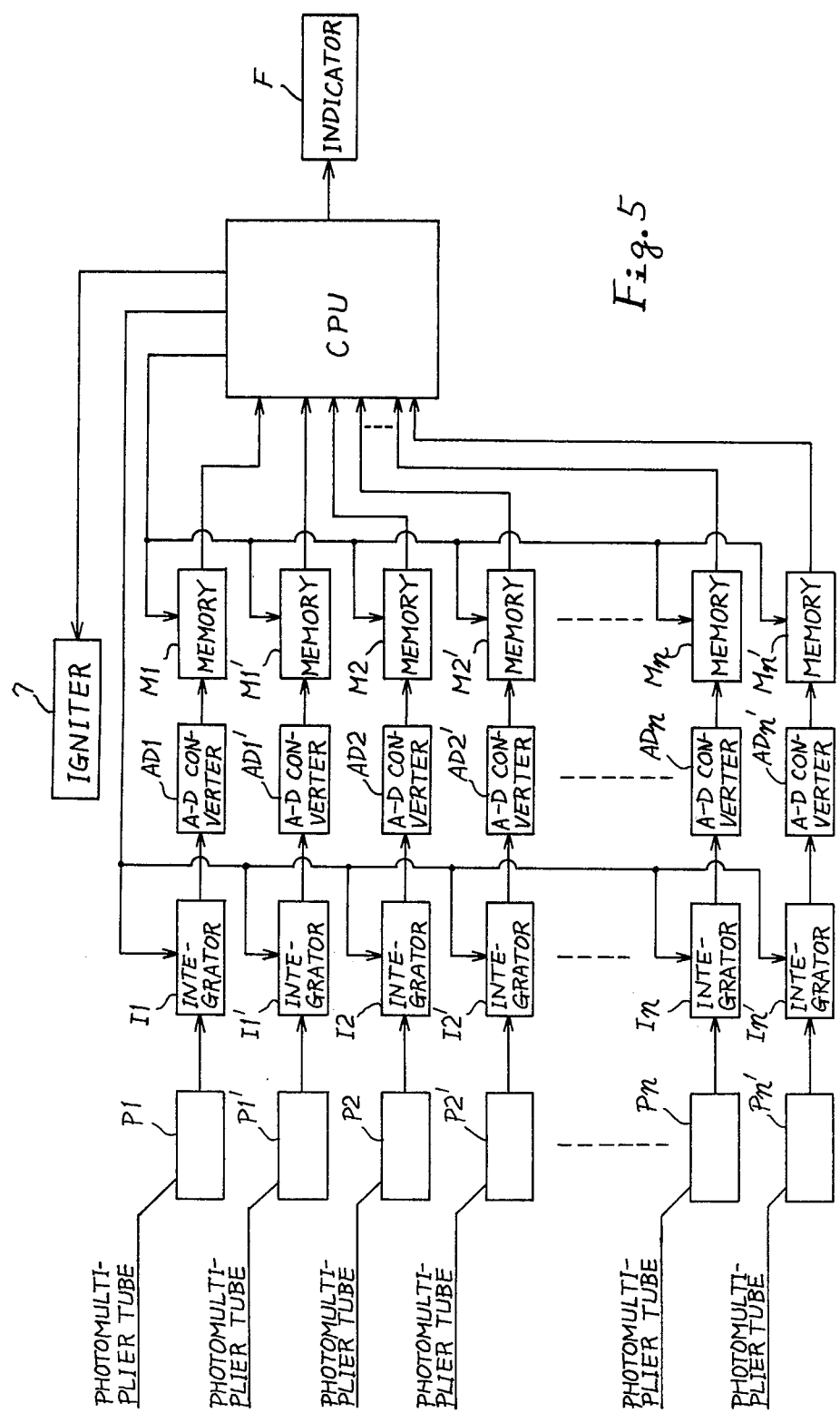
FIG. 5 is a block diagram similar to FIG. 4 but showing another embodiment of the invention.

FIG. 4 shows an example of the circuit dealing with the signals from the photomultiplier tubes $P1, P2, \ldots Pn$ and $P1', P2', \ldots Pn'$. As previously mentioned, the photomultiplier tubes designated by $P1, P2, \ldots Pn$ correspond to the emission lines of the spectrum of the elements to be determined while those tubes designated by the same symbols with a prime $P1', P2', \ldots Pn'$ correspond to the internal standard lines.

The outputs from the photomultiplier tubes $P1, P2, \ldots Pn$ and $P1', P2', \ldots Pn'$ are applied to integrators $I1, I2, \ldots In$ and $I1', I2', \ldots In'$, respectively. In FIG. 4 although only the integrator $I1$ is shown in detail, it is to be understood that the other integrators are of the same construction. The integrators are of the Miller type comprising an operational amplifier A, a feedback capacitor Co and an input resistor r, with a field effect transistor FET connected across the capacitor Co so as to function as a clearing switch. The sequence controller 8 previously mentioned with reference to FIG. 2 applies a pulse to the gate of the transistor FET to render it conducting. The waveform of this pulse is shown at d in FIG. 3. During the existence of the pulse d the transistor FET is conducting so that the integrators $I1$ and $I1'$ to $In$ and $In'$ are cleared all at once.

Figure 3:
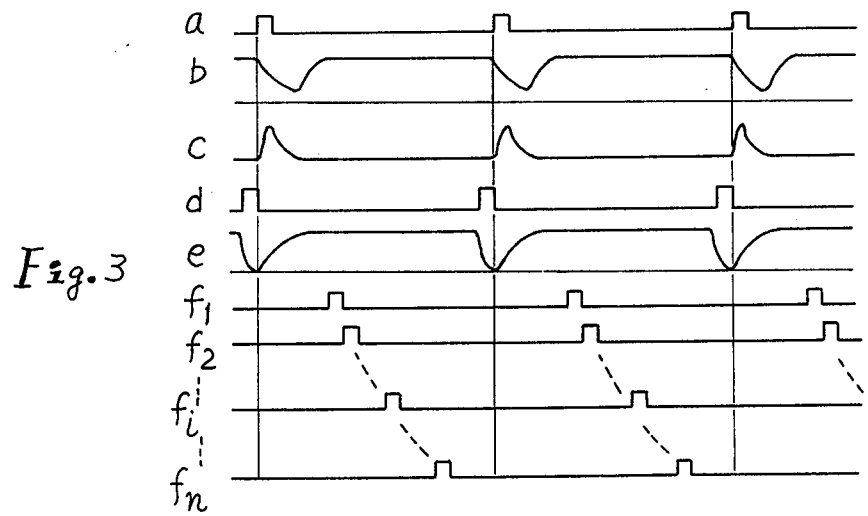
FIG. 3 is a diagram of different waveforms at different parts of the apparatus of the invention.

The intensity of the light caused by spark discharge between the electrode 2 and the sample 1 changes as shown by the waveform c in FIG. 3, which also shows the output of the photomultiplier tube $P1, P1', \ldots Pn,$ or $Pn'$. At each discharge the output of each of the photomultiplier tubes is integrated by the corresponding one of the integrators $I1, I1', \ldots In$ and $In'$, which are cleared immediately before the next discharge occurs. Therefore, the waveform of the output of the integrator $I1, I1', \ldots In,$ or $In'$ is as shown at e in FIG. 3, with the saturated level of the wave indicating the amount of emitted light of the emission line at one discharge.

The outputs of the integrators are applied to a pair of multiplexers M1 and M1' each having a plurality of input terminals 1, 2, . . . i, . . . n and a single output terminal 0 so arranged that under the control of the sequence controller 8 each of the input terminals is selectively and successively connected to the output terminal.

Each of the output terminals of the integrators I1, I2, . . . In which correspond to the spectral emission lines of the elements to be determined is connected to the corresponding one of the input terminals 1, 2, . . . n of the multiplexer M1. Also, each of the output terminals of the integrators I1', I2', . . . In' which correspond to the internal standard lines is connected to the corresponding one of input terminals 1, 2, . . . n of the multiplexer M1'. In the latter case, suppose for example that the integrators I1 and I2 correspond to the spectral emission lines of the two elements E1 and E2 to be determined, respectively. If a single common internal standard line is selected for the two emission lines and the integrator I1' corresponds to the common internal standard line, the output terminal of the integrator I1' will be connected to both input terminals 1 and 2 of the multiplexer M1'.

Generally, if the integrator Ii corresponds to the emission line of the spectrum of a certain element to be determined, the output terminal of that integrator is connected to the ith input terminal i of the multiplexer M1, while the output terminal of the integrator Ii' corresponding to the internal standard line for the above-mentioned emission line is connected to that one of the input terminals of the multiplexer M1' which has the same number as the above-mentioned number i.

The sequence controller 8 controls the multiplexers M1 and M2 in such a manner that the connection between the input and output terminals in the two multiplexers is changed synchronously. Therefore, the outputs of the multiplexers M1 and M1' are the integrated value of the intensity of the emission line of an element being determined and that of the corresponding internal standard line, respectively.

In each of the multiplexers M1 and M1', the selective and succesive connection of each of the input terminals to the output terminal is effected by the timing pulses f1, f2, . . . fn shown in FIG. 3 and supplied by the controller 8, and one cycle of switching of all the input terminals is completed between one spark discharge and the next spark discharge, that is, from the time the emitted light disappears to the time the integrators are cleared. As shown in FIG. 3 while the pulse f1 exists, the first input terminal 1 remains connected to the output terminal 0 in both multiplexers M1 and M1', and while the second pulse f2 exists, the second input terminal 2 instead of the first is connected to the output terminal 0. In a similar manner each of the succeding input terminals 3, . . . i, . . . n is selectively and successively connected to the output terminal 0.

This cycle of changing the connection between input and output terminals in the multiplexers M1 and M1' is repeated each time a spark discharge occurs.

The outputs of the multiplexers M1 and M1' are applied to a divider D which is an integrated circuit analog divider and produces an output corresponding to the output of the multiplexer M1 divided by the output of the multiplexer M1'. The output of the divider D is applied to a third multiplexer M2 having a single input terminal IN and a plurality of output terminals 1, 2, . . . i, . . . n so arranged that under the control of the sequence controller 8 the input terminal IN is selectively and successively connected to each of the output terminals 1, 2, . . . i, . . . n. This selective and successive connection of the input to the output terminals is effected in such a manner that while the input terminals i of the multiplexers M1 and M1' are connected to the respective output terminals 0, the input terminal IN of the multiplexer M2 is connected to the corresponding ith output terminal thereof.

The output terminals of the multiplexer M2 are connected to corresponding integrators I1", I2", . . . In", respectively, which are of the Miller type like the previous integrators I1, I1', I2, I2', . . . In, In'.

The output terminals of the integrators I1", I2", . . . In" are connected to the fixed contacts of a rotary switch S, the movable contact of which is connected to the input of an A-D converter AD. The switch is manually operable so that the outputs of the integrators I1", I2", . . . In" may selectively be applied to the A-D converter. The output of the converter is applied to a digital indicator F. A printer may be provided in addition to or in place of the indicator F.

The construction and operation of the apparatus shown in FIGS. 2 and 4 have now become clear, and the following is to supplement the above description to further understanding of the invention.

To operate the apparatus, the high voltage source 3 is switched on and the sequence controller 8 is started, whereupon a lamp L1 is lit to indicate "IN OPERATION".

The sequence controller 8 produces command pulses a shown in FIG. 3, each of which causes a spark discharge to be produced between the sample 1 and the electrode 2, with simultaneous emission of light as shown at c in FIG. 3.

The number of the pulses a is counted in the controller 8 and when a predetermined number of discharges have taken place, the controller 8 stops producing pulses and turns the lamp L1 off and a lamp L2 on to indicate that the operation has now been finished. With no pulse signals supplied from the controller 8 the igniter 7 no longer produces ignition pulses so that no spark discharge will occur between the sample 1 and the electrode 2.

The light emitted at each spark discharge is dispersed in the spectrometer M into different wavelengths, which enter the photomultiplier tubes P1, P2, . . . Pn and P1', P2', . . . Pn', so that both the intensity of the emission line of each of the elements to be determined and that of the corresponding internal standard line are integrated at each spark discharge. The outputs of the integrators I1, I2, . . . In and I1', I2', . . . In' are successively applied through the multiplexers M1 and M1' to the divider D, which provides the ratio of the amount of light of the spectral emission line of each of the elements being determined to that of the corresponding one of the internal standard lines.

The ratios are distributed through the multiplexer M2 into the integrators I1", I2", . . . In" corresponding to the elements being determined, respectively, in which the values of the ratios are added to those which have until then been stored therein at the previous discharges. Thus when several spark discharges have taken place, the output of each of the integrators I1", I2", . . . In" represents the average value of the ratios, obtained at all those discharges, of the amount of light of the emission line of each of the elements being determined to that of the corresponding one of the internal standard lines.

Then when the lamp L2 has been turned on, the switch S is manipulated to successively take out the output of one of the integrators I1'', I2'', ... In'' after another to indicate the values on the indicator F or to have the data directly printed out. From the data it is possible to read the contents of the elements on a calibration curve provided beforehand.

When all of the outputs of the integrators I1'', I2'', ... In'' have been recorded, the integrators are cleared by manipulating the switches S1, S2, ... Sn. Thus one cycle of operation of analysis has been completed.

For processing the outputs of the integrators I1'', I2'', ... In'' the above-mentioned manual operation may be replaced by an automatic operation with an electronic computer. In this case, the computer automatically locates the output of each of the integrators I1'', I2'', ... In'' on the calibration curve for each of the elements to be determined, so that the contents of the elements are printed out. This is a simple application of a microprocessor. The function of the sequence controller 8 may also be performed by the microprocessor.

The above embodiment is an analog system. The invention may also be applied to a digital system as shown by way of example in FIG. 5, wherein the same reference symbols as in FIGS. 2 and 4 designate the corresponding component parts.

The outputs of the photoelectric tubes P1, P2, ... Pn and P1', P2', ... Pn' are integrated by the corresponding integrators I1, I2, ... In and I1', I2', ... In' at each spark discharge. The outputs of the integrators are converted by analog-digital converters AD1, AD2, ... ADn and AD1', AD2', ... ADn', respectively, to the corresponding digital signals, which are stored in the corresponding memories m1, m2, ... mn and m1', m2', ... mn'. The data stored in the memories are applied to an electronic computer CPU, which performs various operations corresponding to those performed by the devices 8, M1, M1', D, M2, and I1'', I2'', ... In' in FIG. 4. The data read out from the CPU are indicated on the indicator F and/or printed out.

The following table shows the reproducibility of the results of measurement in accordance with the invention and the conventional method in terms of the standard deviation of the measured values in a plurality of operations of analysis. The data given in the table have been obtained from quantitative determination of alloying elements of steel. As can be seen from the table, the stability of measurement achieved by the apparatus of the invention is about 1.5 to 2 times as high as has been possible with the conventional apparatus. The values in the column "Total amount contained" have been determined by chemical analysis.

| Sample No. | Elements to be determined | Total amount contained (%) | Standard deviation | |
|---|---|---|---|---|
| | | | Conventional method | Method of the invention |
| 1 | C | 0.1 | 0.0020 | 0.0012 |
| 2 | C | 1.05 | 0.0085 | 0.0055 |
| 3 | Si | 0.05 | 0.0015 | 0.0010 |
| 4 | Si | 0.55 | 0.0050 | 0.0023 |
| 5 | Mn | 0.20 | 0.0025 | 0.0018 |
| 6 | Mn | 1.50 | 0.0012 | 0.00084 |
| 7 | Mn | 1.35 | 0.11 | 0.053 |
| 8 | Ni | 0.15 | 0.0021 | 0.0018 |
| 9 | Ni | 1.20 | 0.010 | 0.0075 |

-continued

| Sample No. | Elements to be determined | Total amount contained (%) | Standard deviation | |
|---|---|---|---|---|
| | | | Conventional method | Method of the invention |
| 10 | Ni | 8.70 | 0.048 | 0.032 |
| 11 | Cr | 0.50 | 0.050 | 0.032 |
| 12 | Cr | 16.30 | 0.072 | 0.035 |

Figure 6:
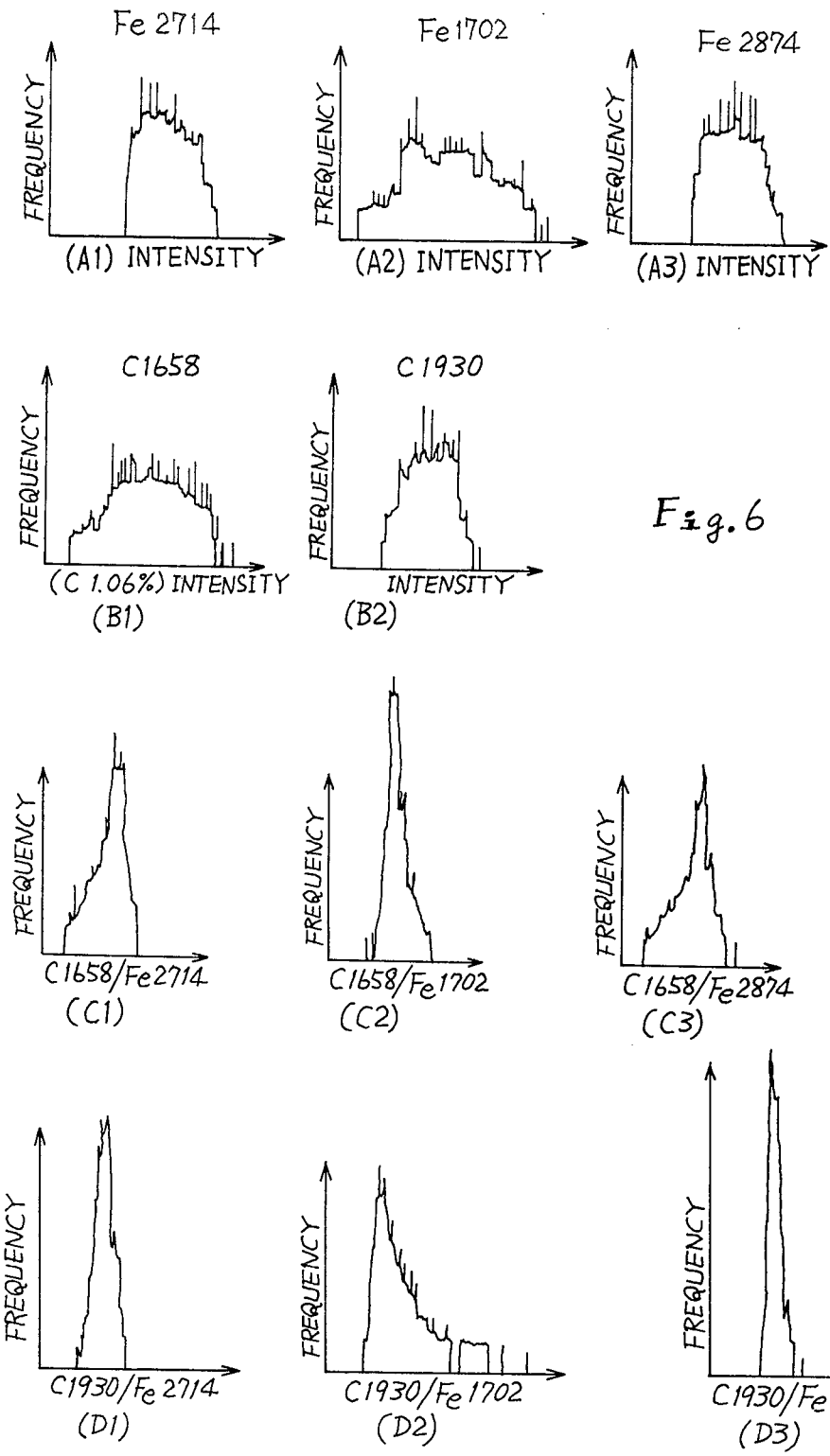
FIGS. 6 and 7 are graphs of frequency distribution showing the advantages of the invention.

FIG. 6 shows graphs of frequency distribution showing the effect of selection of proper internal standard lines for the emission lines of the respective elements to be determined on the results of measurement. In these graphs the amount of light (or the integral of the intensity of light pulse by time) of the emission line of the element to be determined at one spark discharge is taken along the abscissa and the frequency of occurrence is taken along the ordinate. The graphs A1, A2 and A3 have been obtained from the 2714 Å, 1702 Å and 2874 Å emission lines of iron, respectively, and the graphs B1 and B2 from the 1658 Å and 1930 Å emission lines of carbon, respectively.

The graphs C1, C2 and C3 show the frequency distribution of the ratio, obtained at each discharge, of the amount of light of the 1658 Å emission line of carbon to those of the 2714 Å, 1702 Å and 2874 Å emission lines of iron, respectively, used as the internal standard. As is obvious from the graphs, with the 1702 Å line of Fe used as the internal standard the frequency distribution is less dispersed than with the other lines.

The graphs D1, D2 and D3 clearly show that it is proper to use the 2874 Å line of Fe as the internal standard for the 1930 Å line of C.

Figure 7:
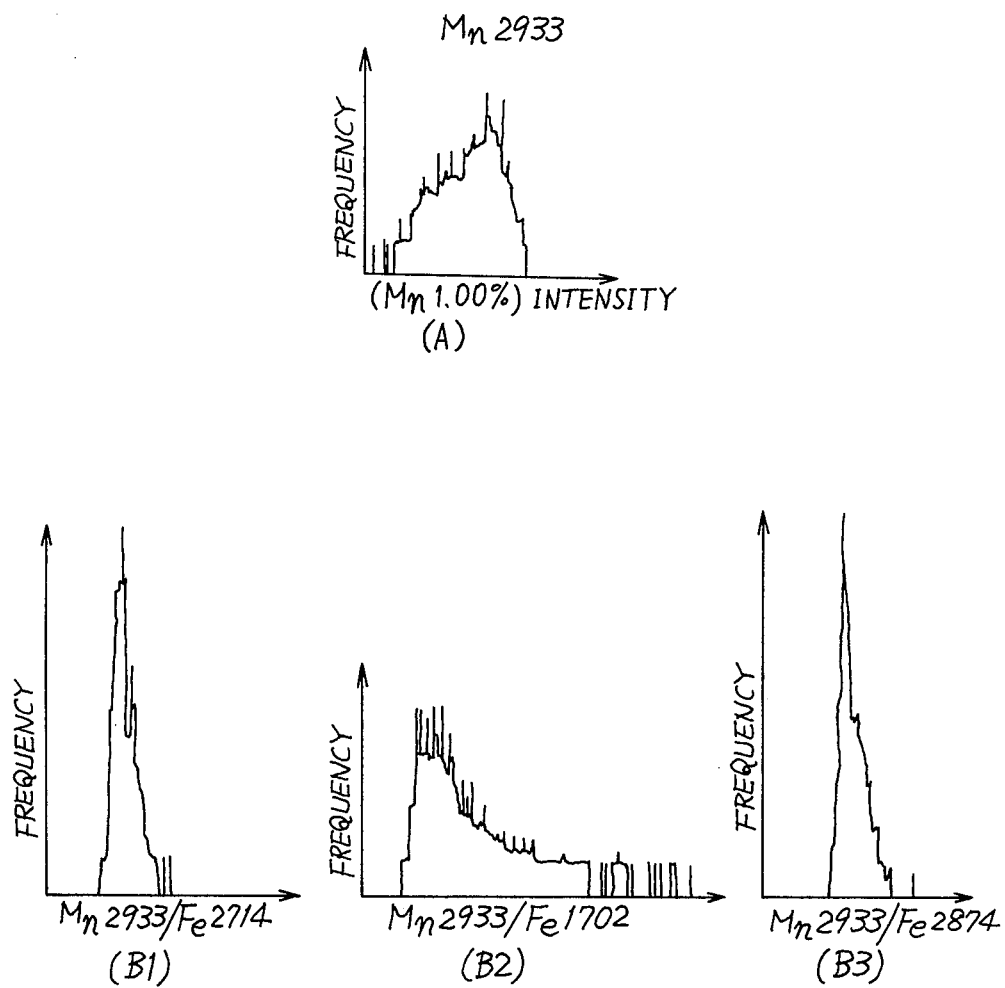

In FIG. 7 the graph A shows the frequency distribution of the amount of light of the 2933 Å emission line of Mn, and the graphs B1, B2 and B3 show the frequency distribution of the ratio of the amount of light of the above emission line of Mn to those of the 2714 Å, 1702 Å and 2874 Å lines of Fe, respectively, used as the internal standard. It is seen that the 1702 Å line of Fe is very improper as the internal standard line.

From the above it is obvious that it is not proper to use one and the same internal standard for different emission lines of the elements to be analyzed, and the significance of the improvement achieved by the invention in the field of art is also obvious.

What we claim is:

1. An apparatus for emission spectrochemical analysis of a sample comprising: means for generating a spark discharge to excite said sample to emit light; means for dispersing said light to produce a spectrum containing emission lines characteristic of the elements in said sample; first photoelectric means for receiving the light of said emission lines of the elements to be determined to produce a first corresponding electrical signal; second photoelectric means for receiving the light of those of said emission lines which are to be used as the internal standards to produce a second corresponding electrical signal; first integrating means for integrating said first electrical signal; second integrating means for integrating said second electrical signal; said first and second integrating means being operable in synchronism with the operation of said spark discharge generating means to perform integration of said first and second signals, respectively, at each said spark discharge; means for causing said integrating means to be cleared before production of the next spark discharge by said spark discharge generating means; means for providing the ratio of the output of said first integrating means caused by each said spark discharge to the output of said second integrating means caused by each said spark discharge; and means for accumulating said ratios resulting from a predetermined number of spark discharges.

2. The apparatus of claim 1, wherein said first photoelectric means comprises a first plurality of photoelectric elements each for receiving the light from one of said emission lines of the elements to be determined to produce a first corresponding electrical signal; said second photoelectric means comprises a second plurality of photoelectric elements each for receiving the light from one of said internal standard lines to produce a second corresponding electrical signal; said first integrating means comprises a first plurality of integrators each for integrating said first electrical signal from one of said first plurality of photoelectric elements; said second integrating means comprises a second plurality of integrators each for integrating said second electrical signal from one of said second plurality of photoelectric elements; said first and second plurality of integrators being operable in synchronism with the operation of said spark discharge generating means to perform integration of said first and second signals, respectively, caused by each said spark discharge; and said ratio providing means provides the ratio of the output of each of said first plurality of integrators caused by each said spark discharge to the output of the corresponding one of said second plurality of integrators caused by each said spark discharge.

3. The apparatus of claim 1, further including means for indicating said accumulated ratios.

4. The apparatus of claim 1, wherein said dispersing means is a grating.

5. The apparatus of claim 2, wherein said first and second photoelectric elements are photomultipler tubes.

6. The apparatus of claim 2, wherein said ratio providing means comprises a first multiplexer having a plurality of input terminals each connected to one of the outputs of said first plurality of integrators and a single output terminal from which the signals applied to said input terminals are selectively and successively taken out at each said spark discharge, a second multiplexer having a plurality of input terminals each connected to one of the outputs of said second plurality of integrators and a single output terminal from which the signals applied to said input terminals are selectively and successively taken out at each said spark discharge in synchronism with said selective and successive taking out of said signals at said input terminals of said first multiplexer from said output terminal thereof, and a divider for dividing the output of one of said first and second multiplexers by the output of the other.

7. The apparatus of claim 1, wherein said ratio providing means comprises a first plurality of analog-digital converters each connected to the output of one of said first plurality of integrators, a second plurality of analog-digital converters each connected to the output of one of said second plurality of integrators, a first plurality of memories each connected to the output of said first plurality of analog-digital converters, a second plurality of memories each connected to the output of one of said second plurality of analog-digital converters, and means for dividing the output of each of said first or second plurality of memories by the output of the corresponding one of said second or first plurality of memories at each said spark discharge.

8. The apparatus of claim 6, wherein said accumulating means comprises a third multiplexer having a single input terminal connected to the output of said divider and a plurality of output terminals from which said signal applied to said input terminal is successively taken out at each said discharge in synchronism with said selective and successive taking out of said signals at said input terminals of said first and second multiplexers from said output terminals thereof, and a third plurality of integrators each connected to one of said plurality of output terminals of said third multiplexer.

9. The apparatus of claim 7, wherein said accumulating means stores said ratios provided by said dividing means during said predetermined number of spark discharges in the respective addresses corresponding to said elements to be determined.

* * * * *